United States Patent
Bircann

(10) Patent No.: US 6,230,742 B1
(45) Date of Patent: May 15, 2001

(54) POPPET VALVE ASSEMBLY APPARATUS HAVING TWO SIMULTANEOUSLY-SEATING HEADS

(75) Inventor: Raul Armando Bircann, Penfield, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/422,475

(22) Filed: Oct. 21, 1999

(51) Int. Cl.⁷ ..................................................... F16K 11/04
(52) U.S. Cl. ...................................... 137/625.34; 251/86
(58) Field of Search ...................... 137/315.27, 625.34, 137/625.5; 251/84, 85, 86

(56) References Cited

U.S. PATENT DOCUMENTS

| 245,662 | * | 8/1881 | Rinderknecht | ................... | 137/625.34 |
| 4,565,217 | | 1/1986 | McIntyre . | | |

FOREIGN PATENT DOCUMENTS

| 1369952 | * | 7/1964 | (FR) | ............................... | 137/625.34 |
| 11835 | * | 9/1897 | (GB) | ............................... | 137/625.34 |

* cited by examiner

*Primary Examiner*—John Fox
(74) *Attorney, Agent, or Firm*—John A. VanOphem

(57) ABSTRACT

A two-headed force-balanced poppet valve assembly wherein the spacing of the valve heads along the pintle shaft is directed by the spacing between the valve seats during assembly and wherein at least one of the valve heads is compliantly mounted on the pintle shaft. The valve body has a central chamber separating first and second valves disposed at opposite ends of the chamber for ingress an/or egress of gas or liquid, one of the valves opening into the chamber and the other valve opening out of the chamber. Axial motion of the pintle shaft causes the valves to be opened or closed simultaneously. One of the valve heads is fixed to the pintle shaft and the other valve head is axially slidable on the shaft and is retained thereon by swaging of the shaft. A compression spring is compressedly retained on the shaft inboard of the slidable head to continuously urge the head against the swage, thereby preventing the head from sliding inwardly along the shaft during valve actuation. Assembly tolerances between the slidable head and the pintle shaft and the swage permit the head to oscillate minutely on the shaft such that intimate seating of the valve head on the valve seat is assured.

3 Claims, 3 Drawing Sheets

POPPET VALVE ASSEMBLY APPARATUS HAVING TWO SIMULTANEOUSLY-SEATING HEADS

TECHNICAL FIELD

The present invention relates to poppet valves, and more particularly, to a force-balanced poppet valve assembly wherein two valve heads disposed on a common pintle shaft open and close simultaneously with respect to their respective valve seats.

BACKGROUND OF THE INVENTION

Poppet valves are widely used for opening and closing flow paths for gases and liquids, for example, as shift diverter valves in vehicles; for channeling hydrogen into reformers in fuel cells; and as intake, exhaust, and exhaust gas recirculation valves in internal combustion engines. A poppet valve typically comprises a circular valve head mounted transversely on a pintle shaft for axial motion thereof to form or eliminate a flow gap between the valve head and a mating circular valve seat in a valve body. A pintle shaft is also known as a valve shaft or valve stem.

Poppet valves can be very demanding in their design and fabrication tolerances. For example, some poppet valves are provided with conical mating surfaces on the valve head and valve seat; however, leak-free sealing over the entire mating surfaces depends on near-perfect circularity, coaxiality, and smoothness of both surfaces. In addition, the surfaces must have substantially identical cone angles. The highest quality valves are ground on a precision lathe and then the valve head is lap-ground to its dedicated seat. This is labor-intensive, time-consuming, and expensive. U.S. Pat. No. 4,565,217 discloses a poppet valve having a conical head and a curved seat such that head and seat can seal along a circular line of contact, thereby obviating the need for matching cone angles.

Known poppet valves further require that the valve head be mounted perfectly orthogonal to the valve stem and that a plane containing the valve seat be perfectly parallel to a plane containing the valve head. Deviation in any of these relationships can cause the head to mate imperfectly with the seat, which can result in valve leakage.

Poppet valves used to divert a portion of an engine's exhaust gas stream into the intake stream (Exhaust Gas Recirculation, or EGR) can encounter significantly different pressures in these two streams, such that a single poppet control valve between them may require a powerful actuator to overcome the pressure difference. It is known to provide, therefore, a force-balanced poppet valve, having two valve elements operated by a single pintle shaft, one valve opening into the exhaust stream and the other opening into the intake stream, wherein the intake vacuum and exhaust pressure exerted across the two valves substantially cancel each other, permitting the valve to be controlled by an inexpensive, low-power actuator.

An important performance criterion for such a force-balanced valve is that the two valves open and close to a high degree of synchronicity. This requires that the spacing of the valve heads on the pintle shaft be identical with the spacing of the valve seats in the valve body. It requires further that the identical spacing be maintained over the full range of operating conditions, particularly temperatures.

The latter behavior can be provided by constructing the valve body, valve heads, and pintle shaft of the same material, for example, stainless steel, such that these components expand and contract at the same rate in response to thermal changes.

The requirement for identical spacing of the heads is more difficult to satisfy. Typically, during assembly, the first head is installed on the pintle shaft, either by being formed with the shaft or by being attached thereto, and seated on its seat; then the second head is slid onto the pintle shaft, seated against its own seat, and secured to the shaft as by welding, bolting, or the like. A problem with these techniques is that the second head and/or shaft may be deformed thereby, ruining the synchronicity of the assembled valve. If the head or shaft is distorted so that the head is not perfectly orthogonal to the shaft, the resulting valve cannot close properly. Such deformation can also create error in the axial location of the distal end of the pintle shaft, which may be cooperative with a position sensing apparatus during throttling operation of the valve. Valves thus deformed, if still usable, may require individual calibration after assembly, which is costly and time-consuming.

Alternatively, the shaft may be provided with an accurately-located inner shoulder against which the second valve head may be seated in the proper relationship to the first valve head and then be secured as described supra. Such a configuration is highly intolerant of error in placement of the shoulder or error during assembly, and is also vulnerable to the deformation potential noted above.

What is needed is a two-headed poppet valve wherein the spacing of the valve heads along the pintle shaft is directed by the spacing between the valve seats, wherein at least one of the valve heads is compliantly mounted on the pintle shaft, and wherein the compliantly-mounted head may be so mounted without engendering errors in spacing of the valve seats along the pintle shaft.

SUMMARY OF THE INVENTION

The present invention is directed to an improved two-headed poppet valve assembly wherein the spacing of the valve heads along the pintle shaft is directed by the spacing between the valve seats and wherein at least one of the valve heads is compliantly mounted on the pintle shaft.

The assembly has a valve body having a central chamber separating first and second valves. The valves comprise first and second valve seats and first and second valve heads coaxially disposed in spaced-apart relationship at opposite ends of the chamber for ingress and/or egress of gas or liquid, one of the valves opening into the chamber and the other valve opening out of the chamber. The valve seats are spaced apart by a selected axial distance. The valve assembly further comprises a pintle shaft for axially actuating the valve heads, the shaft being disposed coaxially through the valve seats. The first and second valve heads are spaced apart along the pintle shaft at the same axial distance as the distance between the valve seats, such that axial motion of the pintle shaft causes the first and second valves to be opened or closed simultaneously.

One of the valve heads is fixed to the pintle shaft and, when placed against its respective seat, provides a valve-closed reference position for the pintle shaft. The other valve head is axially slidable on the shaft. During assembly of the valve, the second valve head is seated against the second valve seat to establish the correct head spacing. The shaft is then provided with head-restraining means, for example, as by bolting and preferably by swaging of the shaft outboard of the second head to prevent the head from sliding outwardly along the shaft to an increased spacing from the first head. Such means does not connect the head to the shaft but serves only to limit outward travel of the head along the shaft away from the first head to a distance equal to the spacing between the valve seats. Inboard of the second head along the pintle shaft, a compression spring is compressedly retained thereon to bear upon the inner surface of the second head to continuously urge the second head against the head-retaining means, thereby preventing the second head from sliding inwardly along the shaft during valve actuation. Assembly tolerances between the second head and the pintle shaft swaging permit the head to pivot minutely on the shaft to conform to the angle of the valve seat such that intimate seating of the valve head on the valve seat is assured.

BRIEF DESCRIPTION OF THE DRAWINGS

The foregoing and other objects, features, and advantages of the invention, as well as presently preferred embodiments thereof, will become more apparent from a reading of the following description, in connection with the accompanying drawings in which.

DESCRIPTION OF THE PREFERRED EMBODIMENT

Figure 1:
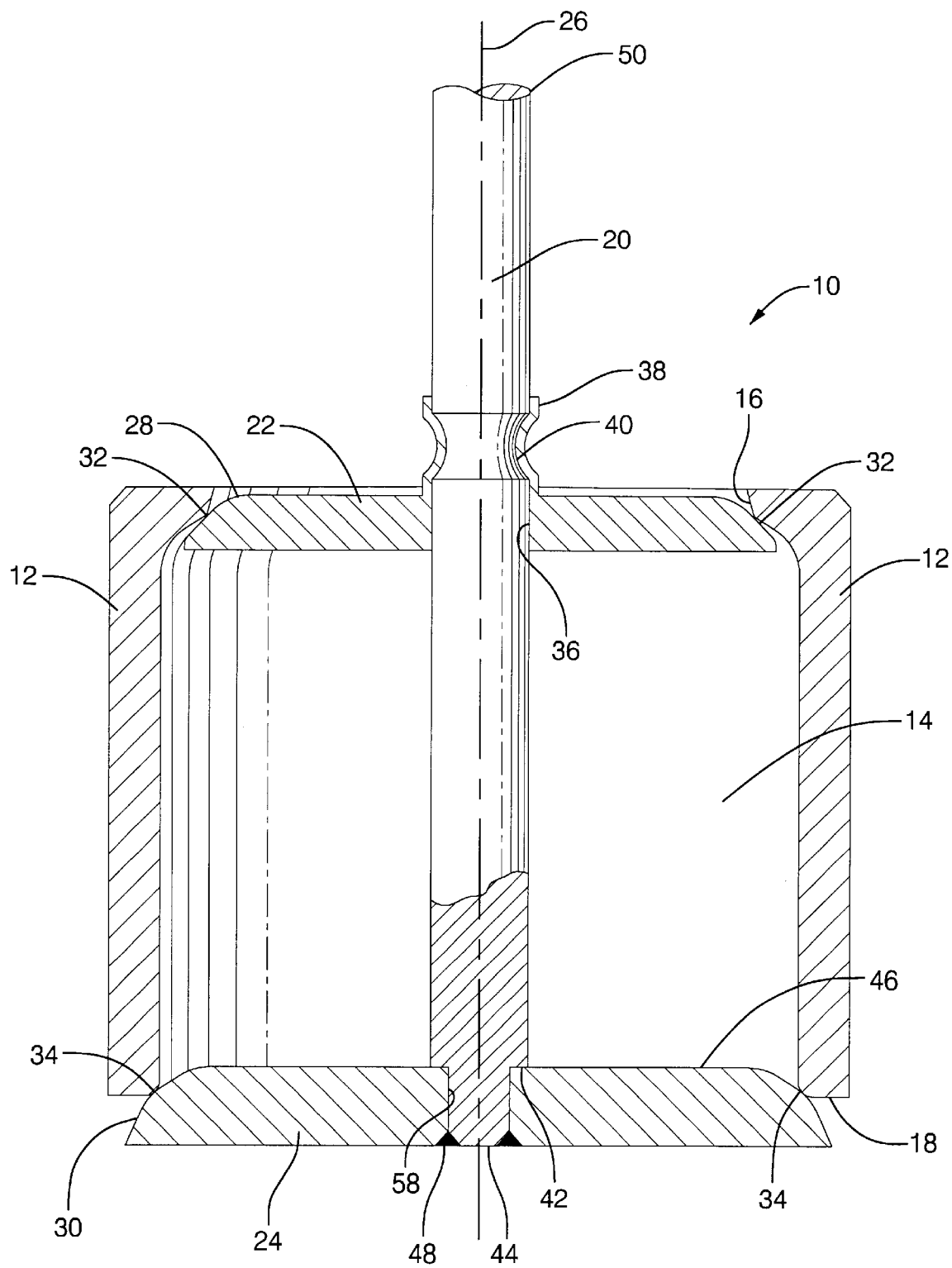
FIG. 1 is an elevational view, partially in cross-section, of a prior art two-headed force-balanced poppet valve.
Figure 2:
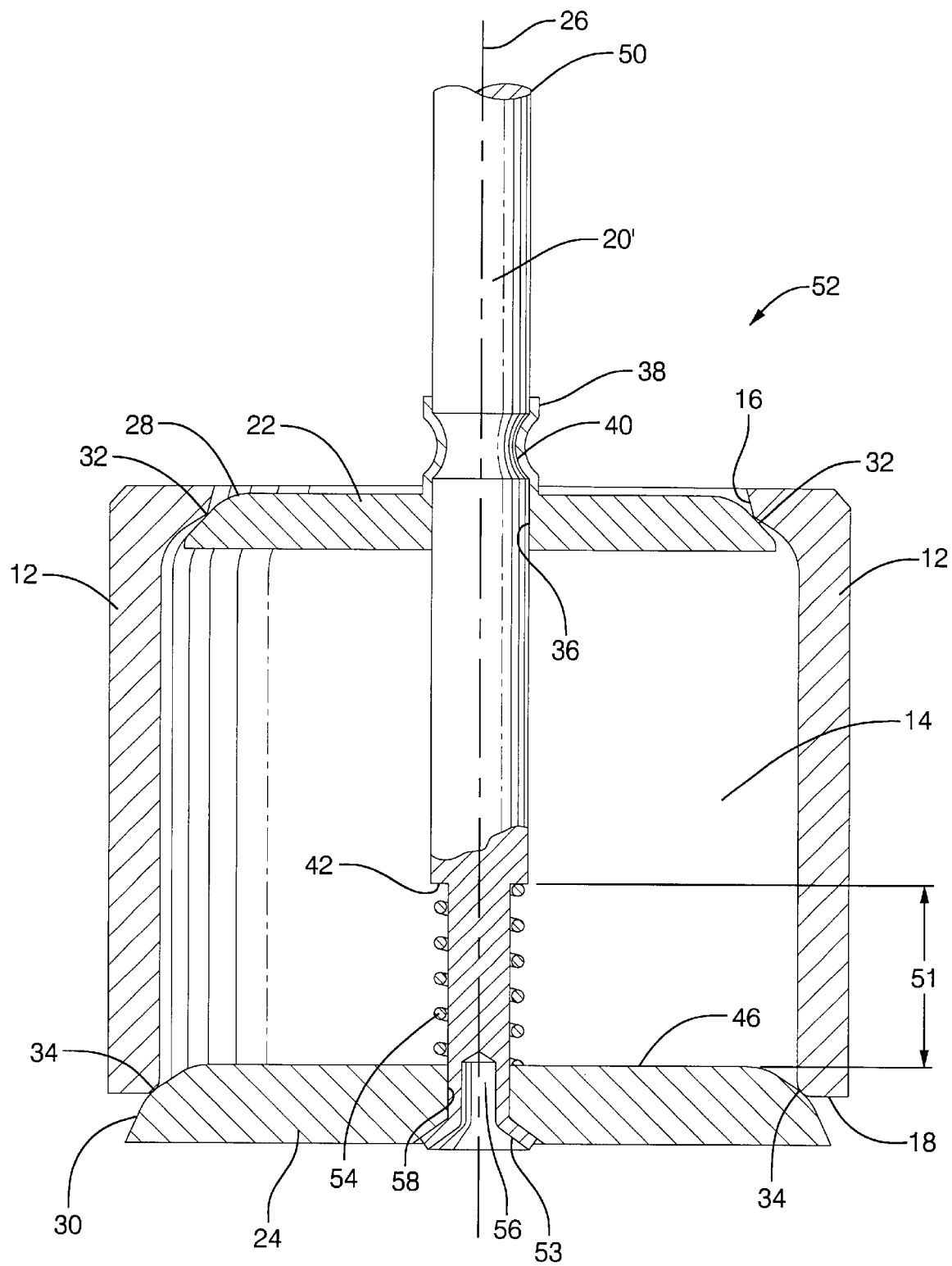
FIG. 2 is an elevational view, partially in cross-section, of a preferred embodiment of a two-headed poppet valve in accordance with the present invention.

Referring to FIG. 1, a prior art two-headed poppet valve assembly 10 includes a valve body 12 enclosing a chamber 14. (It should be understood that the valves shown in FIGS. 1 and 2 represent cross-sectional views of a gas flow conduit, for example, an engine exhaust gas manifold, wherein gas flow through the manifold is in a direction perpendicular to the plane of the drawing.) Chamber 14 has first and second openings to the exterior of valve body 12 defined by valve seats 16 and 18, respectively, the seats being coaxially disposed at opposite ends of chamber 14. Seats 16,18 may be conical, rounded, or sharp-cornered, as is known in the art of poppet valves. Preferably, seats 16,18 have a rounded or radial cross-sectional profile. Disposed coaxially with seats 16,18 and extending therethrough is a pintle shaft 20 for supporting and axially translating first and second valve heads 22 and 24. Heads 22,24 are fixedly mounted on shaft 20 such that planes including a face of each valve are perpendicular to the axis 26 of shaft 20. Heads 22,24 are provided at their outer periphery with surfaces 28,30 appropriate for mating with seats 16,18, respectively, preferably in first and second circular line contacts 32,34, respectively.

Head 22 is provided with a central bore 36 and cylindrical flange 38 for accepting passage of shaft 20 during assembly. Head 22 is fixedly mounted on shaft 20 as by crimping flange 38 into recess 40, as shown in FIG. 1.

Shaft 20 is provided with a shoulder 42 near its outer end 44 for receiving the inner surface 46 of head 24 and for positioning head 24 at a predetermined distance from head 22. Head 24 is provided with a central bore 58 for receiving shaft 20 and is fixedly attached to shaft 20 as by bolting, brazing, or by welding 48 as shown in FIG. 1. Further, shaft 20 may be operatively connected at its opposite end 50 to an actuator (not shown), for example, a programmably-controlled solenoid or stepper motor, in known fashion to control the position of heads 22,24 relative to seats 16,18, and thereby to control the flow of gas or liquid through the valves.

For proper operation of a two-headed force-balanced poppet valve assembly, it is essential that the two valves open synchronously and close synchronously; otherwise, the valve assembly cannot fully close and will leak. Thus the heads must be precisely spaced on the shaft and attached thereto such that contacts 32 and 34 are formed or broken simultaneously. In practice in accordance with the prior art, this is quite difficult to accomplish. In the prior art valve shown in FIG. 1, recess 40 and shoulder 42 must be spaced along shaft 20 by exactly the distance between contacts 32 and 34. Any error in axial location of either recess 40 or shoulder 42 on the shaft must lead to failure of the valves to function synchronously.

Figure 3:
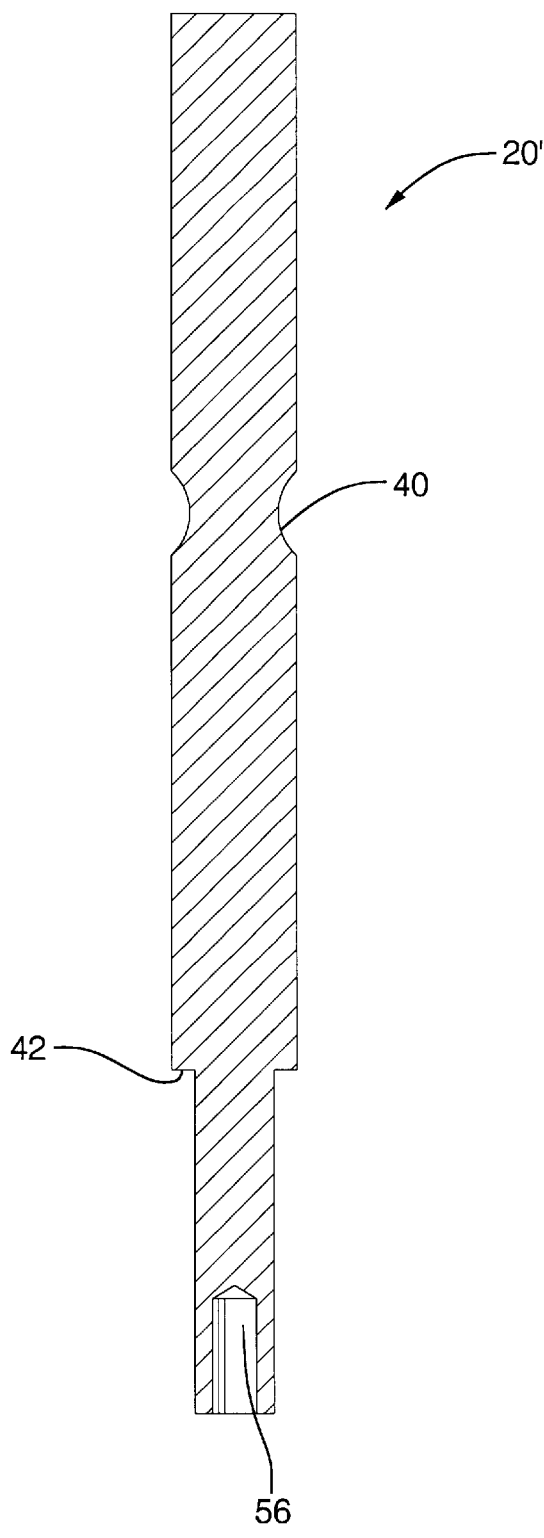
FIG. 3 is a cross-sectional view of the pintle shaft of the valve shown in FIG. 2, shown prior to assembly of the valve.
Figure 4:
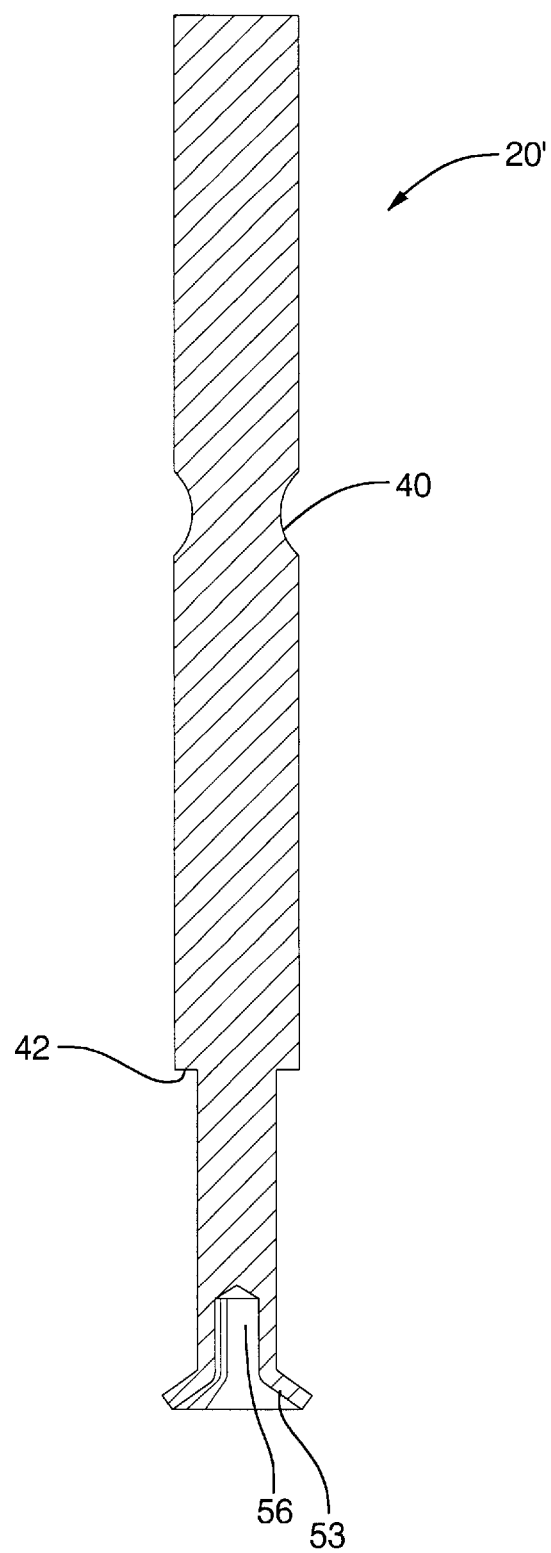
FIG. 4 is a cross-sectional view like that shown in FIG. 3, showing the shape of the pintle shaft after assembly of the valve, as shown in FIG. 2.

Referring to FIGS. 2–4, a two-headed poppet valve assembly 52 in accordance with the invention is similar in overall layout to prior art valve 10, having a valve body 12 enclosing a chamber 14, first and second valve seats 16,18 oppositely disposed at first and second openings in chamber 14, and first and second valve heads 22,24 disposed for mating with seats 16,18, respectively.

Novel valve assembly 52 differs from prior art valve 10 in the configuration in which second head 24 is mounted and retained on novel pintle shaft 20'. A stop 42 on shaft 20', for example, a shoulder as shown in FIG. 2, is located at a distance 51 from the inner surface 46 of head 24 to accommodate a spring 54 therebetween, spring 54 being longer in its rest state than distance 51 so that when the valve is assembled, the spring is under compression. The use of spring 54 between the shaft stop 42 and valve head 24 effectively removes the axial position of the shoulder as a source of error in the assembled valve, making pintle shaft 20' less costly and more robust to manufacture than pintle shaft 20.

As shown in FIGS. 2–4, shaft 20' is further provided with a blind bore 56 for receiving a known swaging tool for use in forming a flared swage 53 for retaining head 24 and spring 54 on shaft 20'.

Valve assembly 52 may be assembled as follows, to assure that each head is simultaneously in contact with its respective seat. First head 22 is slid onto shaft 20' and flange 38 is crimped into recess 40 to secure the head to the shaft. The subassembly of shaft and first head is inserted through valve body 12 such that surface 28 of first head 22 is seated on first seat 16 at contact line 32, the inside diameter of second seat 18 being sufficient to permit passage of first head 22 therethrough. If it is desired that the two valves be the same diameter, then other strategies for placing the first head within the chamber must be adopted, for example, valve body 12 may be threadably separable into two parts (not shown).

With first head 22 in place, shaft 20' protrudes axially through second seat 18. Spring 54 is entered onto shaft 20' and seated against shoulder 42. Second head 24 is entered onto shaft 20', compressing spring 54, until contact is formed with second seat 18 along contact line 34. Spring 54 pressing against shoulder 42 assures that the first head remains in contact with the first seat during this operation. With each head thus held correctly in contact with its respective seat, the outer end of shaft 20' is expanded to form a flared terminus 53 to shaft 20', as shown in FIGS. 2 and 4, preferably by being swaged with a swaging tool in known fashion. If desired, bore 58 may be chamfered at its outer end to acommodate swage 53, as shown in FIG. 2.

After shaft 20' is swaged, compressed spring 54 continuously urges head 24 against flared terminus 53, thereby sealing the head on the shaft against leakage from chamber 14. Other retaining means, such as welding or bolting, are not as desirable as swaging, although they are within the scope of the invention, because they fixedly attach the second head to the pintle shaft, whereas swaging does not. Because the second head is retained at precisely the proper distance along the shaft from the first head without being fixedly attached to the shaft, and because the diameter of bore 58 is greater than the diameter of shaft 20' where the shaft passes through the bore, the second head is thus compliantly mounted and is free to vertically oscillate slightly. Such compliance permits an additional degree of operational freedom and removes a major potential source of error and failure in prior art two-headed poppet valve assemblies, overcoming minor non-parallelism between the first and second seats and between the first and second valve heads which may occur in manufacturing of the assembly or which may develop over time in use of the valve assembly. Thus, simultaneous and synchronous opening and closing of the two valves in valve assembly 52 is assured.

The foregoing description of the preferred embodiment of the invention has been presented for the purpose of illustration and description. It is not intended to be exhaustive nor is it intended to limit the invention to the precise form disclosed. It will be apparent to those skilled in the art that the disclosed embodiments may be modified in light of the above teachings. The embodiments described are chosen to provide an illustration of principles of the invention and its practical application to enable thereby one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. In a poppet valve assembly having a valve body enclosing a chamber, an opening in the valve body connecting the chamber in communication with the outside of the valve body, a valve seat disposed in the valve body and surrounding the opening, and a valve head axially translatable with respect to the valve seat, the improvement comprising:
    a) an axial bore through said valve head;
    b) a pintle shaft slidably disposed through said axial bore and having means at one end for retaining said head on said shaft and having stop means disposed on said shaft adjacent the side of said valve head opposite from said retaining means, wherein said retaining means is a flared swage; and
    c) spring means disposed in compression between said valve head and said stop means.

2. A poppet valve assembly in accordance with claim 1 wherein said stop means is a shoulder.

3. A poppet valve assembly having a plurality of poppet valves disposed coaxially in a valve body, said valves comprising a plurality of valve seats and a plurality of valve heads, said heads being disposed on a single pintle shaft for synchronous actuation of said heads with respect to said seats,
    wherein at least one of said valve heads is provided with an axial bore having a first diameter,
    wherein said shaft has a second diameter smaller than said first diameter and is disposed in said bore such that said head is axially slidable with respect to said shaft,
    wherein said shaft is flared at an outer end thereof to retain said at least one of said valve heads thereupon and is provided with a stop at a distance from said at least one of said valve heads, and said assembly further comprises a spring disposed in compression between said valve head and said stop,
    wherein said at least one of said valve heads is axially oscillatable with respect to said shaft.

* * * * *